United States Patent
Qian et al.

(10) Patent No.: US 7,978,975 B2
(45) Date of Patent: Jul. 12, 2011

(54) PASSIVE OPTICAL NETWORK SYSTEM EMPLOYING SUB-CARRIER MULTIPLEXING AND ORTHOGONAL FREQUENCY DIVISION MULTIPLE ACCESS MODULATION SCHEMES

(75) Inventors: Dayou Qian, Plainsboro, NJ (US); Junqiang Hu, Princeton, NJ (US); Philip Nan Ji, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 595 days.

(21) Appl. No.: 12/184,781

(22) Filed: Aug. 1, 2008

(65) Prior Publication Data
US 2010/0028002 A1 Feb. 4, 2010

(51) Int. Cl.
*H04J 14/00* (2006.01)
(52) U.S. Cl. .................................................. 398/69
(58) Field of Classification Search .............. 398/68–69, 398/89
See application file for complete search history.

(56) References Cited

OTHER PUBLICATIONS

W. Wei et al., "Optical Orthogonal Frequency Division Multiple Access (OFDMA)-Based Optical Access/Metro Ring Networks", OFC 2008, Feb. 24-28, 2008.*
W. Wei et al., "MAC Protocols for Optical Orthogonal Frequency Division Multiple Access (OFDMA)-Based Passive Optical Netowrks", OFC 2008, Feb. 24-28, 2008.*
D. Qian et al., "10-Gb/s OFDMA-PON for Delivery of Heterogeneous Services", OFC 2008, Feb. 24-28, 2008.*
L. Xu et al., "OFDMA-Based Passive Optical Networks (PON)", IEEE/LEOS Summer Topical Meetings, Jul. 21-23, 2008.*
Cvijetic, Milorad., et al. Passive Components and Fiber-based Devices II. "Emerging Technologies and Applications Related to Fiber Access Networks." 2005. Proc. of SPIE vol. 6019. (601901-1 to 601901-8) (8 pages).
Koonen, Ton. Proceedings of the IEEE. "Fiber to the Home/Fiber to the Premises: What, Where, and When?" vol. 94, No. 5, May 2006. pp. 911-934.

* cited by examiner

*Primary Examiner* — Shi Li
(74) *Attorney, Agent, or Firm* — James Bitetto; Joseph Kolodka (57) ABSTRACT

Implementations of the present principles include methods, systems and apparatuses for transmitting data through a sub-carrier multiplexing and orthogonal frequency-division multiple access passive optical network. In accordance with aspects of the present principles, a plurality of optical network units are assigned electrical carrier frequency bandwidths that are narrower than a system capacity bandwidth. Modulation of optical waves transmitted between an optical line terminal and each optical network unit is conducted on different orthogonal sub-carrier frequencies within the assigned bandwidths such that sampling of said orthogonal sub-carrier frequencies is limited to the assigned electrical carrier frequency bandwidths. The waves are thereafter received and demodulated for the extraction of data.

20 Claims, 6 Drawing Sheets

PASSIVE OPTICAL NETWORK SYSTEM EMPLOYING SUB-CARRIER MULTIPLEXING AND ORTHOGONAL FREQUENCY DIVISION MULTIPLE ACCESS MODULATION SCHEMES

BACKGROUND

1. Technical Field

The present invention relates generally to passive optical networks and more particularly to passive optical networks utilizing a sub-carrier multiplexing scheme.

2. Description of the Related Art

Passive Optical Network (PON) systems are commonly employed to provide high-bandwidth-guaranteed services and high-definition video services, among other services. Typically, passive optical networks incorporate a point-to-multipoint architecture in which a single optical fiber may be used to service multiple users. Examples of passive optical network architectures include time division multiplexing (TDM) networks, wavelength division multiplexing (WDM) networks, and sub-carrier multiplexing networks (SCM), each of which is discussed briefly below.

TDM Networks

Figure 1:
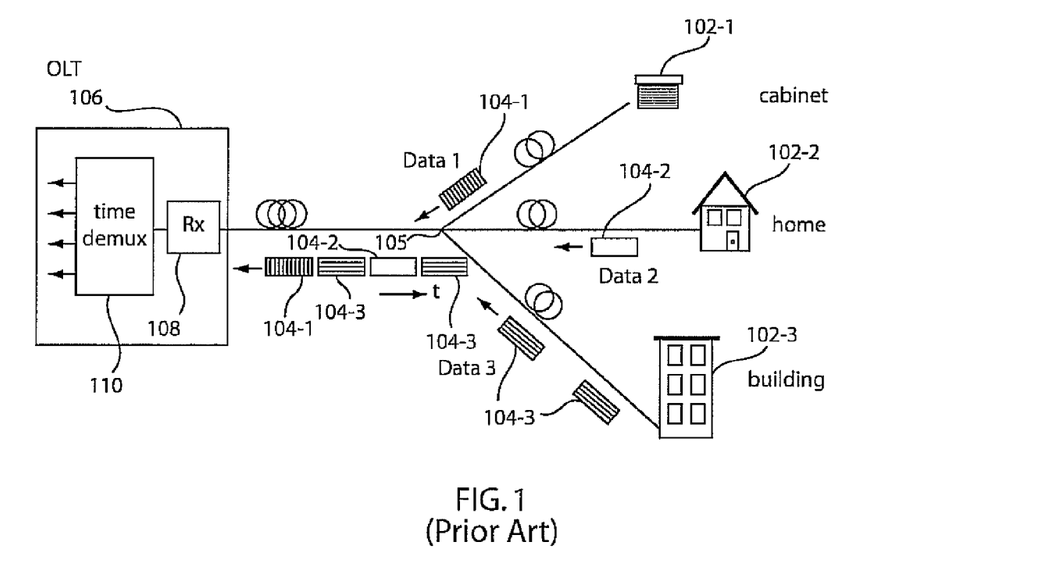
FIG. 1 is a block/flow diagram illustrating a TDM-PON system.

With reference to FIG. 1, an exemplary TDM-PON system 100 is illustrated. The TDM-PON system 100 may include a plurality of optical network units (ONUS) 102-1, 102-2, 102-3, situated at client locations for the upstream transmission of data streams 104-1, 104-2, 104-3, respectively, and an optical line terminal (OLT) 106 for receiving the data that may include a receiver 108 and a time de-multiplexer 110. In conformance with current PON architectures, the common fiber feeder of the PON is shared by all the ONUs terminating the branching fibers. Transmission of upstream traffic from the ONUs to the OLT generally entails incorporating accurate multiple access techniques so that the traffic streams generated by the ONUs are multiplexed in a collision-free way onto the common feeder fiber.

As illustrated in the TDM-PON of FIG. 1, the upstream packets from the ONUs are time-interleaved at a power splitting point 105, which involves careful synchronization of the packet transmission instants at the ONUs. This synchronization is achieved by means of grants sent from the OLT, which instruct the ONUs when to send a packet. The correct timing of these submissions may be achieved by ranging protocols, which sense the distance from each optical network unit (ONU) to the OLT. In the OLT, a burst mode receiver 108 is utilized to timely synchronize packets originating from different ONUs. The burst mode receiver 108 also may manage amplitude levels of the packets, which may vary due to differences in path loss experienced by packets originating from different ONUs.

While a single receiver may be employed in a TDM-PON system, the TDM-PON system suffers from a disadvantage in that transmission capacity per ONU is limited. Because the ONUs jointly share the capacity of the OLT, the average data transmission capacity per ONU decreases as the number of ONUs increases.

WDM Networks

In contrast to TDM-PON systems, the transmission rate per ONU in WDM-PON systems is generally not dependent on the number of ONUs. A WDM-PON enables each ONU to occupy the bandwidth of a single optical wavelength, which may permit transmission up to 10 Gb/s or higher.

Figure 2:
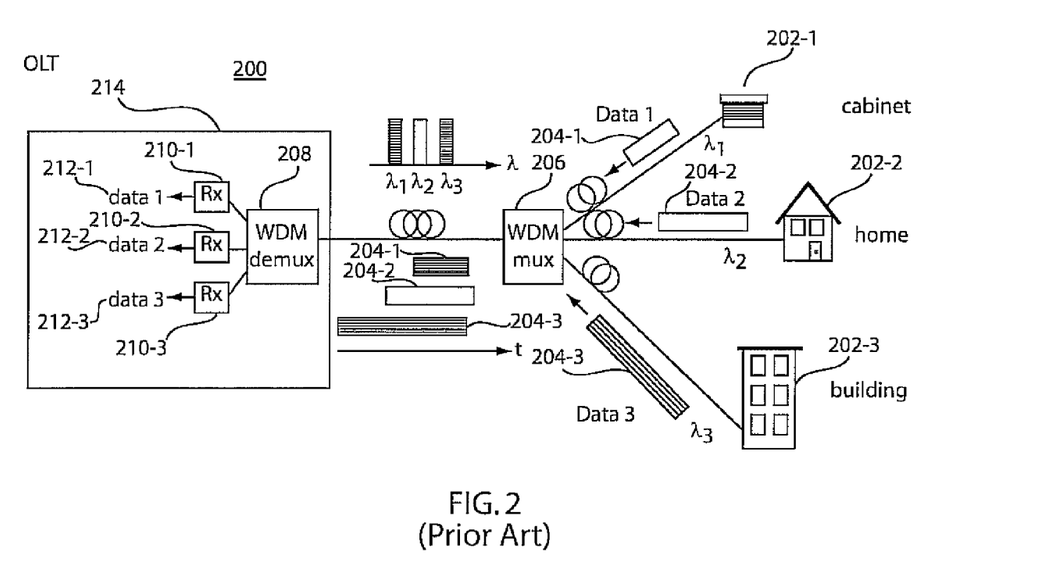
FIG. 2 is a block/flow diagram illustrating a WDM-PON system.

With Reference to FIG. 2, an exemplary WDM-PON system 200 is depicted. WDM-PON system 200 may include ONUs 202-1, 202-2 and 202-3, which transmit data streams 204-1, 204-2 and 204-3, respectively. In WDM-PON systems, m subscribers use m wavelengths to transmit upstream data simultaneously. In the example provided in FIG. 2, m is three, corresponding to three ONUs and three wavelengths, $\lambda_1, \lambda_2$ and $\lambda_3$. Thus, ONUs 202-1, 202-2 and 202-3, transmit data along wavelengths $\lambda_1, \lambda_2$ and $\lambda_3$, respectively, to a WDM multiplexer 206, which may comprise an Array Waveguide Grating (AWG).

The m upstream signals may be aggregated by the WDM multiplexer 206 and transmitted through a single optical fiber to an OLT 214 in a central office. The OLT 214 includes a WDM demultiplexer 208, which may comprise another AWG, configured to de-multiplex the upstream signals into multiple wavelength-dependent signals received by m optical receivers, 210-1, 210-2 and 210-3. The receivers 210-1, 210-2 and 210-3 extract data streams 212-1, 212-2 and 212-3 originating from ONUs 202-1, 202-2 and 202-3, respectively.

Thus, in a WDM-PON system, the wavelength channels may be routed between the OLT and ONUs in both directions by a wavelength demultiplexing/multiplexing device located at the PON splitting point, such as WDM multiplexer 206. Each ONU utilizes a different wavelength channel, for example, $\lambda_1, \lambda_2$ and $\lambda_3$, to send its packets to the OLT and, as a result, the OLT is required to employ a WDM de-multiplexer 208 along with a receiver array, for example, 210-1, 210-2 and 210-3, to receive and process the upstream signals. The wavelength channels constitute independent communication channels on which different signal formats may be implemented. Furthermore, time synchronization between the channels is not needed to differentiate between data streams originating from different ONUs.

WDM-PON offers one solution for multiple accesses that creates a virtual point-to-point topology on a physical point-to-multipoint topology. Thus, in analogy with point-to-point system concepts, the WDM-PON concept facilitates scaling toward larger numbers of ONUs and enables simple service upgrading per individual customer.

However, current WDM-PONs are required to have one AWG and multiple receivers at the OLT to receive upstream data from multiple optical network units, which consequently increases the expense of the OLT. Therefore, due to the additionally required wavelength-selective functions (e.g., multiple wavelength dependent receivers and an AWG) at the OLT, WDM-PON is a costly solution. In addition, current WDM-PON systems lack flexibility in that they are incapable of dynamically allocating bandwidths to the ONUs. For example, when one ONU goes off-line, its bandwidth cannot automatically be assigned to another ONU.

Comparison of WDM-PONs and TDM-PONs illustrates that there is currently a trade-off between OLT cost and overall capacity. The OLT with a single receiver, as utilized in TDM-PON, is relatively low cost, but can only provide a single wavelength capacity without scalability. In contrast, in WDM-PON systems, the OLT can provide a larger capacity, but its cost and complexity are much higher due to its receiver array.

SCM Networks

Figure 3:
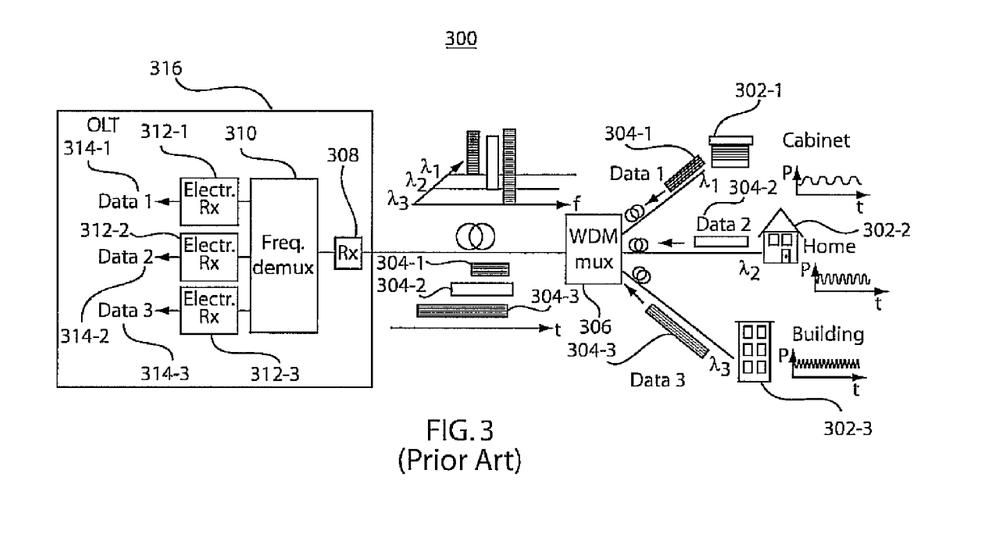
FIG. 3 is a block/flow diagram illustrating a SCM-WDM-PON system.

With reference to FIG. 3, a subcarrier modulation (SCM) WDM-PON system 300 is illustrated. System 300 may include a plurality of ONUs 302-1, 302-2 and 302-3, which respectively transmit data streams 304-1, 304-2 and 304-3 along wavelengths $\lambda_1, \lambda_2$ and $\lambda_3$, as described above with respect to WDM-PON system 200. However, unlike PON systems described above, the various ONUs modulate their packet streams on different electrical carrier frequencies and subsequently modulate the light intensity of their respective laser diodes. The packet streams are thus put into different electrical frequency bands. Each frequency band constitutes an independent communication channel transmitted from an ONU 302 to an OLT 316, and thus may carry a signal in a format different from that in another channel. Additionally, no time synchronization of the channels is needed.

The laser light modulated by the ONUs is multiplexed at WDM multiplexer 306 and transmitted to a photo detector 308 at the OLT 316, which converts the modulated light into modulated electrical signals within the different electrical frequency bands. The different electrical frequency bands are de-multiplexed at the OLT 316 by a frequency demultiplexer 310 and are transmitted to electrical receivers 312-1, 312-2 and 312-3. Data streams 314-1, 314-2 and 314-3, originating from ONUs 302-1, 302-2 and 302-3, respectively, are extracted by electrical receivers 312-1, 312-2 and 312-3, respectively.

While SCM-PON architectures can reduce the number of photo detectors employed to one, they require multiple electrical receivers. In addition, the electrical receivers need different band-pass filters to separate the different frequency bands and perform the frequency and time synchronization individually with each corresponding carrier frequency. To achieve the flexibility and scalability of dynamic capacity sharing among all ONU-s, tunable band-pass filters are required and the local oscillator is required to have the ability to synchronize with different carrier frequencies. Thus, although the SCM-PON may provide simultaneous wavelength-based transmission and dynamic bandwidth control flexibility within the same system, the analog components in the OLT increases the system complexity and cost significantly.

Although various existing PON systems have different advantages, as described above, existing PON systems do not meet current demands for providing cost efficient optical transmission networks. Specifically, existing PON systems do not provide an OLT with a single receiver; large capacity, simultaneous wavelength-based transmissions; dynamic and cost-efficient sharing of bandwidth capacity among all ONUs; and scalability and flexibility to incorporate additional ONUs and enable individual upgrades.

SUMMARY

Systems, methods and apparatuses in accordance with various implementations of the present principles address the deficiencies of the prior art by providing an SCM-Orthogonal Frequency-Division Multiple Access (OFDM/A)-WDM-PON (SOW-PON). A SOW-PON system, for example permits use of a simplified OLT receiver unit that may include a single optical receiver and a single electrical receiver for receiving multiple signals at different wavelengths simultaneously and enabling dynamic bandwidth allocation among optical network units. Furthermore, a SOW-PON system in accordance with aspects of the present principles also permits the incorporation of digital to analogue converters in optical network units that efficiently utilize a lower sampling rate than an analogue to digital converter employed at an optical line terminal.

One implementation of the present principles is directed to a method for transmitting data through a sub-carrier multiplexing and orthogonal frequency-division multiple access passive optical network including the steps of: assigning to each of a plurality of optical network units, in accordance with a sub-carrier multiplexing scheme, an electrical carrier frequency bandwidth that is narrower than a system capacity bandwidth; modulating optical waves in accordance with an orthogonal frequency-division multiple access scheme such that each optical network unit is allocated a different set of orthogonal sub-carrier frequencies and such that sampling of the orthogonal sub-carrier frequencies for each optical network unit is limited to the corresponding electrical carrier frequency bandwidth assigned to the optical network unit; and receiving and demodulating the optical waves to extract data.

Another implementation of the present principles is directed to system for transmitting data through a sub-carrier multiplexing and orthogonal frequency-division multiple access passive optical network including: a plurality of optical network units, each of which is assigned, in accordance with a sub-carrier multiplexing scheme, an electrical carrier frequency bandwidth that is narrower than a system capacity bandwidth, wherein each optical network unit is configured to transmit optical waves that are modulated in accordance with an orthogonal frequency-division multiple access scheme such that different sets of orthogonal sub-carrier frequencies are allocated to each optical network unit and such that sampling of the orthogonal sub-carrier frequencies for each optical network unit is limited to the corresponding electrical carrier frequency bandwidth assigned to the optical network unit; and an optical line terminal that is configured to receive the modulated optical waves for data processing and is configured to assign the electrical frequency bandwidths and allocate the sets of orthogonal sub-carrier frequencies to the plurality of network optical units.

A different implementation of the present principles is directed to a receiver apparatus for receiving data through a sub-carrier multiplexing and orthogonal frequency-division multiple access passive optical network including: a control unit configured to assign to each of a plurality of optical network units, in accordance with a sub-carrier multiplexing scheme, an electrical carrier frequency bandwidth that is narrower than a system capacity bandwidth, wherein the control unit is further configured to allocate, in accordance with an orthogonal frequency-division multiple access scheme, a different set of orthogonal sub-carrier frequencies to each optical network unit such that sampling of said orthogonal sub-carrier frequencies for each optical network unit is limited to the corresponding electrical carrier frequency bandwidth assigned to the optical network unit; a photodetector configured to convert received optical signals to electrical signals, wherein the electrical signals are modulated in accordance with an orthogonal frequency-division multiple access scheme such that a different set of orthogonal sub-carrier frequencies originate from each of a plurality of optical network units; and an electrical receiver configured to extract data originating from the plurality of optical network units by demodulating electrical carrier frequency bandwidths that are narrower than a system capacity bandwidth, wherein each electrical carrier frequency bandwidth corresponds to each of the plurality of optical network units.

These and other features and advantages will become apparent from the following detailed description of illustrative implementations thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 4:
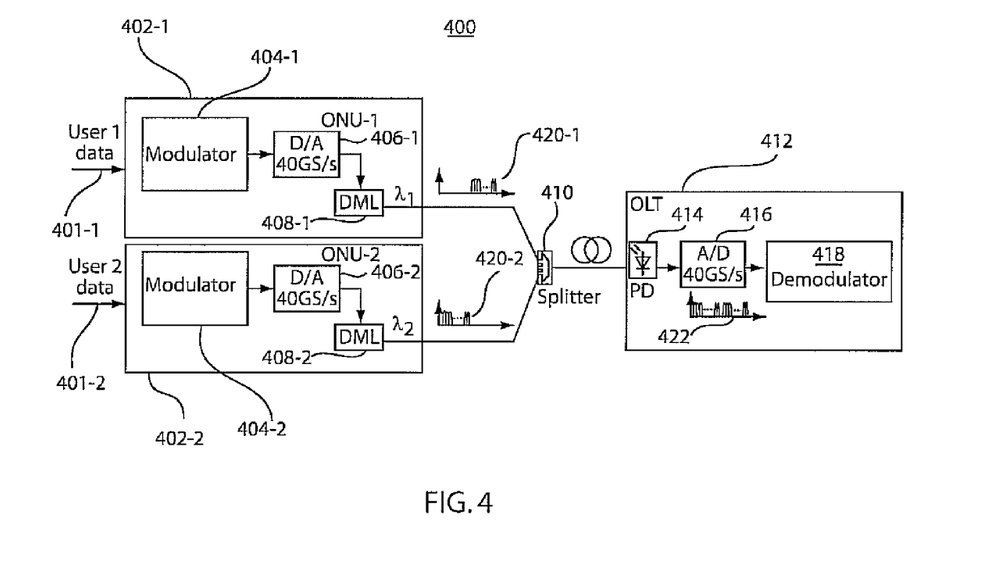
FIG. 4 is a block/flow diagram illustrating an OFDM/A-PON system.

Referring now in detail to the figures in which like numerals represent the same or similar elements and initially to FIG. 4, an exemplary Orthogonal Frequency-Division Multiple Access (OFDM/A) Passive Optical Network (OFDMA-PON) system is illustrated. OFDM/A is a modulation scheme that may be characterized as a hybrid of Orthogonal Frequency-Division Multiplexing (OFDM) and Time Division Multiple Access (TDMA) modulation scheme. OFDM is based upon the principle of frequency-division multiplexing (FDM). A digital bit stream that is to be transmitted is split into several parallel bit streams, typically dozens to thousands, transmitted simultaneously. The available frequency spectrum is divided into several sub-channels, and each low-rate bit stream is transmitted over one sub-channel by modulating a sub-channel using a standard modulation scheme, for example, PSK, QAM, etc. The sub-channel frequencies are chosen so that the modulated data streams are orthogonal to each other, meaning that cross-talk between the sub-channels is eliminated.

The OFDM/A is essentially a hybrid technique, which combines OFDM and TDMA, in that users are dynamically assigned sub-channels (OFDM) in different time slots (TDMA). Unlike OFDM in which all the sub-channels are used by a single user at a time, users share both sub-channels and time slots in OFDM/A.

With reference to FIG. 4, an OFDM/A-PON system 400 is illustrated. OFDM/A-PON system 400 may include ONUs 402-1 and 402-2, each of which respectively include modulators 404-1, 404-2 for modulation of corresponding data streams 401-1, 401-2, digital to analogue converters (DAC) 406-1, 406-2 for converting modulated digital data streams to modulated analogue data streams, and directly modulated lasers (DML) 408-1, 408-2 for transmitting the data streams on optical wavelengths $\lambda_1$, $\lambda_2$, respectively. The system 400 also includes a multiplexer/demultiplexer 410, which may comprise an AWG, for transmitting optical signals between the ONUs and an OLT 412. Upon receiving optical signals from a multiplexer/demultiplexer 410, the OLT 412 employs a photo detector 414, an analogue to digital converter (ADC) 416 and a demodulator 418 to extract data originating from the ONUs.

In an OFDM/A-PON system, the total available bandwidth is dependent upon the bandwidth of both optical and electrical receivers in the OLT, especially the ADC sample processing speed at the OLT. During transmission, the total available bandwidth is split into multiple sub-carriers (such as 128, 256, 512, etc.) which are orthogonal to each other. The OFDM/A frames are composed of those sub-carriers, which are allocated in the frequency domain.

For both upstream and downstream traffic in an OFDM/A-PON, sub-carriers are grouped into multiple sub-channels, where each sub-channel includes one or more sub-carriers. Each ONU is assigned at least one sub-channel for the transmission of its data on its sub-channel. The data bit steam at each ONU is split into multiple streams and transmitted through corresponding multiple sub-carriers assigned to the ONU. The serial bits stream of one ONU is only mapped to the assigned sub-carriers/sub-channels for that ONU and is spread in the frequency domain. The un-assigned sub-channels are set to zero and are reserved for other ONUs.

Referring again to FIG. 4, all the upstream OFDMA frames transmitted by the ONUs are combined at the multiplexer/demultiplexer 410 or coupler point to form a complete OFDM frame. Because different ONUs utilize different sub-channels, interference can be avoided.

To support dynamic bandwidth control in the physical (PHY) layer, each ONU has the same high-speed DAC as the ADC in the OLT to generate a wideband signal. For example, if the ADC in the OLT has 40 Gsample/sec speed, the DAC in all the ONUs also have 40 Gsample/sec speed. Such high-speed sampling rates contribute to the significant cost of the ONU systems.

Figure 5:
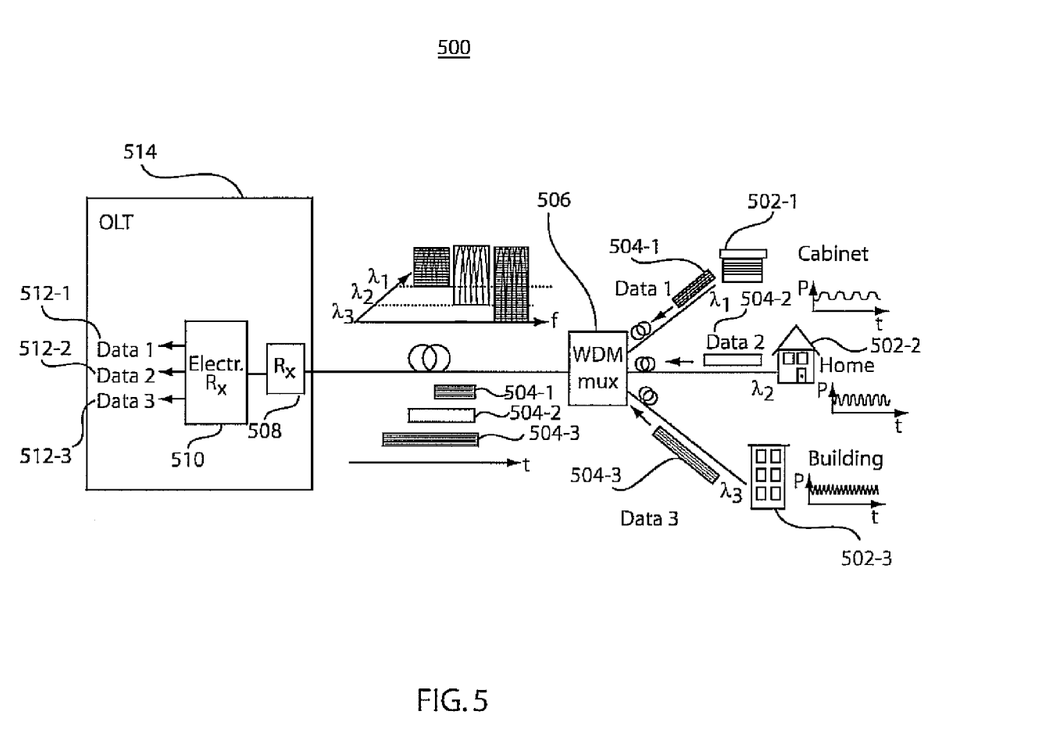
FIG. 5 is a block/flow diagram illustrating an exemplary SOW-PON system in accordance with implementations of the present principles.

Referring now to FIG. 5, an exemplary SOW-PON system 500 in accordance with one implementation of the present principles enabling the use of digital to analogue converters in ONUs with efficient sampling rates is illustrated. A SOW-PON system may include optical network units 502-1, 502-2 and 502-3 that transmit data streams 504-1, 504-2 and 504-3, respectively, along optical wavelengths $\lambda_1$, $\lambda_2$ and $\lambda_3$, respectively, chosen in accordance with a wavelength division multiplexing scheme.

The optical waves are modulated by the ONUs to transmit their corresponding data streams, as discussed below, and are multiplexed by a WDM multiplexer 506. Subsequently, the signals are received by an optical receiver 508 within an optical line terminal (OLT) 514. The optical signals are converted by the optical receiver 508 into electrical signals and are thereafter received by an electrical receiver 510, also within OLT 514, which extracts data streams 512-1, 512-2 and 512-3, respectively corresponding to data streams 504-1, 504-2 and 504-3.

It should be understood that while three ONUs are described for the sake of simplicity many more ONUs may be included in a SOW-PON system. Additionally, although the wavelengths are chosen in accordance with a WDM scheme, the wavelengths may be varied only slightly to avoid any optical beat noise.

Figure 6:
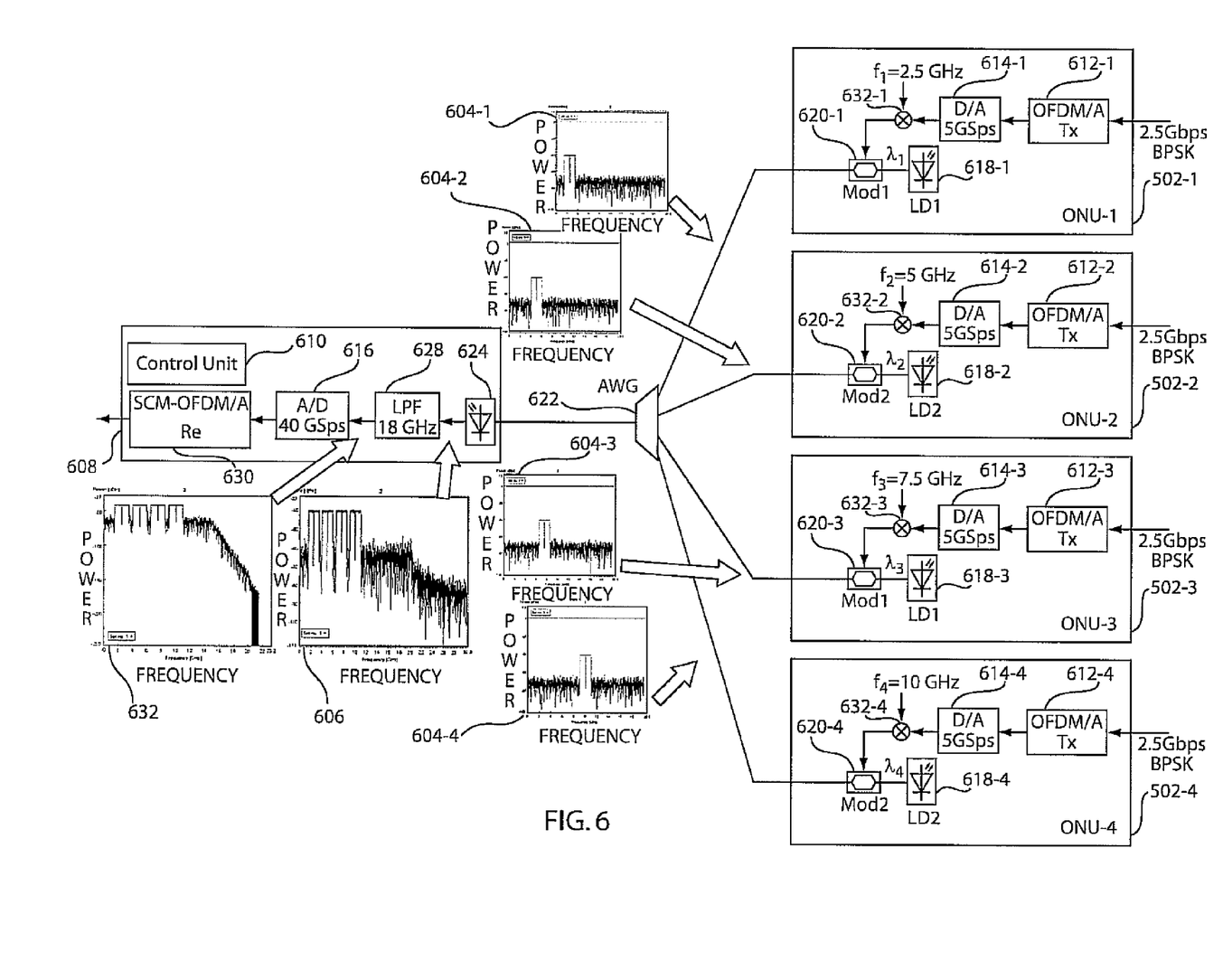
FIG. 6 is more detailed block/flow diagram illustrating an exemplary SOW-PON system and corresponding apparatuses in accordance with implementations the present principles.
Figure 7:
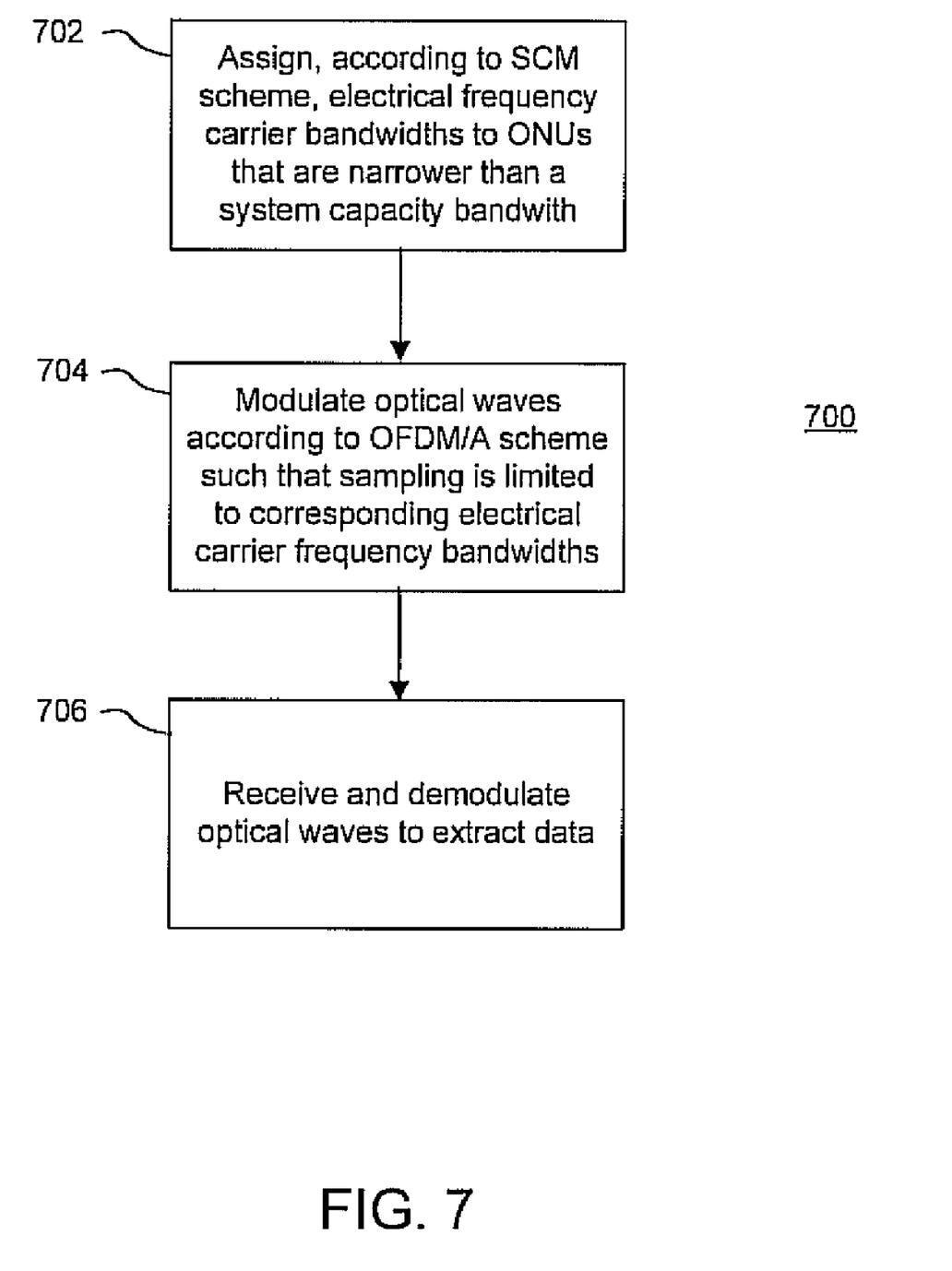
FIG. 7 is a flow diagram illustrating a method for transmitting data through a SOW-PON in accordance with implementations of the present principles.

With reference to FIGS. 6 and 7, a more specific exemplary system implementation 600 and an exemplary method implementation 700 for transmitting data through a SOW-PON in accordance with aspects of the present principles is illustrated. SOW-PON system 600 may include ONUs 502-1, 502-2, 502-3 and 502-4 that may comprise OFDM/A transmitters 612-1, 612-2, 612-3, 612-4, digital to analogue converters 614-1, 614-2, 614-3, 614-4, oscillators 632-1, 632-2, 632-3, 632-4, laser diodes 618-1, 618-2, 618-3, 618-4 and modulators 620-1, 620-2, 620-3, 620-4. In addition, system 600 may include an OLT 608 and a WDM multiplexer/demultiplexer, such as an AWG 622. The OLT 608 may include a photo detector 624, a low pass filter 628, an analogue to digital converter 616, and an SCM-OFDM/A receiver 630. Operations of components of system 600 are discussed in more detail below with regard to method 700.

Method implementation 700 may begin at step 702 by assigning to each of the plurality of optical network units an electrical carrier frequency bandwidth in accordance with a sub-carrier multiplexing scheme. For example, as illustrated in FIG. 6, Power v. Frequency plots 604-1 through 604-4 depict the different bandwidths assigned to ONUs 502-1 through 502-4, respectively. In one exemplary implementation, a control unit 610 within an OLT 608 assigns the electrical carrier frequency bandwidths to the ONUs. The control unit 610 may be comprised of a computer processor and memory implementing software performing methods 700 and/or 800. Plots 604 are composed of power values on the vertical axis and frequency values on the horizontal axis. As shown in plots 604, each assigned bandwidth is narrower than a system capacity bandwidth, which is the total readable bandwidth by the OLT. A Power vs. Frequency plot 606, for example, illustrates a system capacity bandwidth readable by the OLT 608.

Additionally, the electrical carrier frequency bandwidth of each optical network unit assigned in step 702 may be centered by a different carrier frequency. For example, the electrical carrier frequency bandwidth of ONU 502-1 may be centered around a frequency 2.5 GHz, the electrical carrier frequency bandwidth of ONU 502-2 may be centered around a frequency 5 GHz, the electrical carrier frequency bandwidth of ONU 502-3 may be centered around a frequency 7.5 GHz and the electrical carrier frequency bandwidth of ONU 502-4 may be centered around a frequency 10 GHz. Moreover, to maintain orthogonality, each of the assigned electrical carrier frequency bandwidths may be configured to have the same bandwidth and the central carrier frequencies may be chosen such that they are whole-number multiples of the electrical carrier frequency bandwidth. For example, if the electrical carrier frequency bandwidth or individual sub-carrier bandwidth of one ONU is 1 MHz, all other ONUs should employ 1 MHz as their sub-carrier bandwidth and the carrier frequencies for all the ONU-s should be a whole number multiple of 1 MHz.

Furthermore, it should be understood that although in the specific example illustrated by plots 604 in FIG. 6, the electrical frequency bandwidths do not overlap, in other implementations one or more assigned electrical frequency bandwidths may overlap. However, as described more fully below, if electrical frequency bandwidths overlap, specific sub-carriers or sub-channels within an overlapping electrical bandwidth are allocated to only one ONU at any particular instant in time.

It should also be understood that plots 604 only represent a single moment in time. In accordance with an SCM scheme, the electrical frequency bandwidths may be assigned dynamically over time such that the electrical carrier frequency bandwidth and/or a central carrier frequency may vary for one or more ONUs. It should also be noted that step 702 may be performed before or during step 704.

At step 704, each ONU may modulate optical waves in accordance with an OFDM/A scheme such that each optical network unit is allocated a different set of orthogonal sub-carrier frequencies. For example, the control unit 610 in the OLT 608 may allocate to each ONU 502 a different set of orthogonal sub-carrier frequencies that is within the ONU's assigned electrical carrier frequency bandwidth. An ONU may split its data stream into several parallel hit streams and modulate the parallel bit streams on corresponding orthogonal sub-carrier frequencies within its assigned set of orthogonal sub-carrier frequencies. The orthogonality of the sub-carrier frequencies enable a single electrical receiver to receive and extract data from transmission streams originating from multiple ONUs.

Further, if assigned electrical carrier frequency bands for two ONUs overlap, the sub-carrier specific sub-carriers or sub-channels within an overlapping electrical carrier frequency bandwidth are allocated to only one ONU at any particular instant in time. It should be understood that in another implementation of the present principles, different ONUs may be assigned electrical carrier frequency bandwidths that completely overlap in that they are assigned the same central carrier frequency. If two ONUs are assigned the same central carrier frequency, then each ONU is assigned different sub-carriers within the electrical carrier frequency bandwidth.

Returning to FIG. 7, the modulation in step 704 may be conducted such that sampling of allocated orthogonal sub-carrier frequencies for each optical network unit is limited to the corresponding electrical carrier frequency bandwidth assigned to the optical network unit. For example, as stated above, an ONU may be assigned an electrical carrier frequency bandwidth and allocated a set of sub-carrier frequencies within the electrical carrier frequency bandwidth by control unit 610. The ONU may modulate sub-carrier frequencies within the set and adjust all other non-used sub-carrier frequencies within the assigned electrical carrier frequency bandwidth to zero. Unlike OFDM/A PON systems, an ONU in accordance with SOW-PON implementations of the present principles limits sampling to its assigned electrical carrier frequency bandwidth.

For example, referring to FIG. 4 with continuing reference to FIGS. 6 and 7, ONUs in an OFDM/A PON sample all frequencies within the system capacity bandwidth. As shown in frequency domain plots 420-1 and 420-2, corresponding to ONUs 402-1 and 402-2, respectively, ONU 402-1 adjusts the first half of the system capacity bandwidth to zero and modulates the second half of the system capacity bandwidth while ONU 402-2 modulates the first half of the system capacity bandwidth and adjusts the second half of the system capacity bandwidth to zero. This aspect is enables dynamic allocation of carrier frequencies between ONUs within the full system bandwidth range. Because all frequencies in the system capacity bandwidth of a OFDM/A PON are sampled to permit dynamic allocation of carrier frequencies between ONUs, the digital to analogue converters in the ONUs of an OFDM/A PON system have the same sampling speed as the analogue to digital converter in the OLT.

In contrast, in accordance with SOW-PON implementations of the present principles, assigning to ONUs electrical carrier frequency bandwidths that are narrower than a system capacity bandwidth and limiting OFDM/A sampling to an assigned electrical frequency bandwidth, as discussed above, permits the ONUs to employ DACs with a lower sampling speed than an ADC at an OLT, thereby significantly reducing the cost of ONUS. As stated above, the sampling of ONUs in accordance with aspects of the present principles modulates sub-carrier frequencies and adjusts to zero all other non-used sub-carrier frequencies within the assigned electrical carrier frequency bandwidth. In this way, the number of samples transmitted by DACs over a time interval may be lowered due to limiting sampling within assigned electrical carrier frequency bandwidths for each ONU, as opposed to sampling along the entire system capacity bandwidth for each ONU in OFDM/A-PON systems.

Moreover, SOW-PON system implementations in accordance with aspects of the present principles may dynamically allocate sub-carrier frequencies throughout the full range of the system capacity bandwidth despite employing DACs in ONUs having lower sampling rates than the ADC in the OLT. For example, the set of sub-carrier frequencies allocated in step 704 may be allocated dynamically in the time domain such that allocated orthogonal sub-carrier frequencies may vary for at least one ONU. Thus, "limiting" sampling or "limited" sampling to an assigned electrical carrier frequency bandwidth as applied in the present specification should be understood to mean limiting sampling to an assigned electrical carrier frequency bandwidth at a specific time interval, as different electrical carrier frequency bandwidths and/or sub-carrier frequencies may be dynamically allocated over time.

Further, it should be noted that step 704 may include modulating on different optical wavelengths corresponding to each optical network unit. For example, ONUs 502-1, 502-2, 502-3 and 502-4 modulate different optical wavelengths $\lambda_1$, $\lambda_2$, $\lambda_3$, and $\lambda_4$, respectfully.

Figure 8:
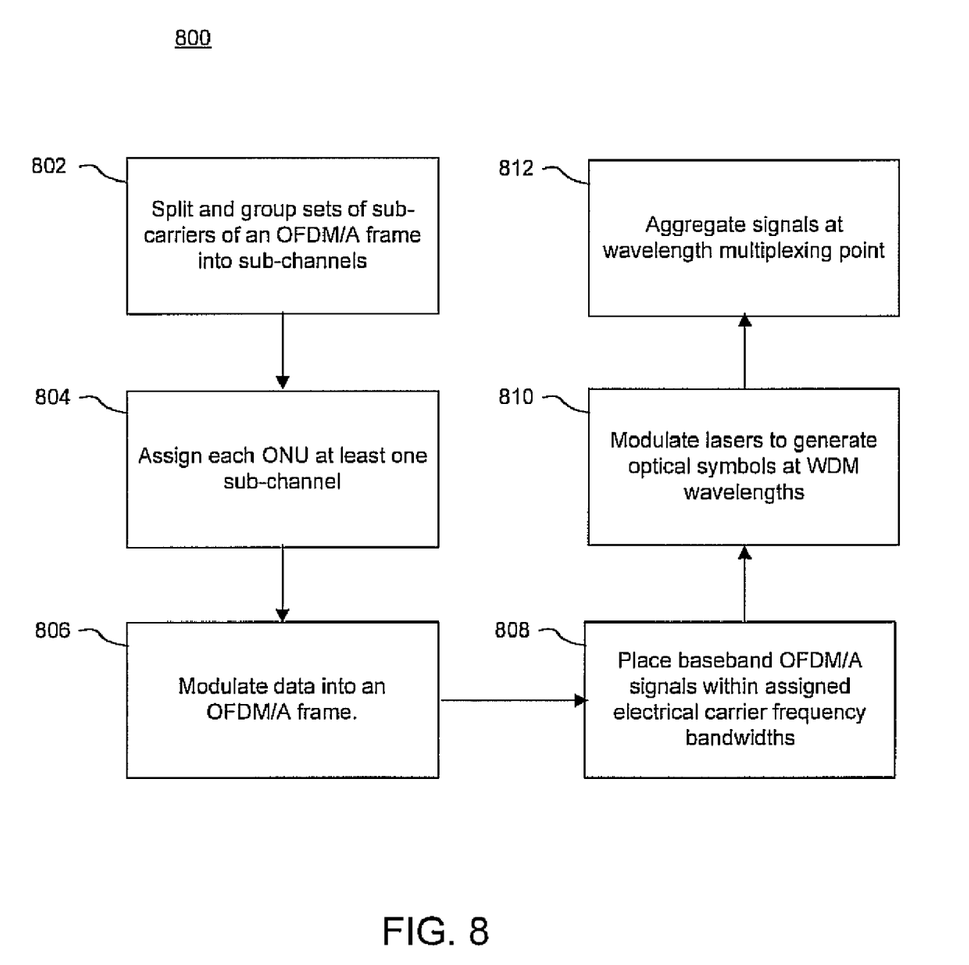
FIG. 8 is a flow diagram illustrating a method for modulating optical waves in accordance with implementations of present principles.

Referring now to FIG. 8 with continuing reference to FIG. 6, one exemplary method 800 for performing modulation step 704 for upstream traffic is illustrated. The method may begin at step 802 in which sets of sub-carriers of an OFDM/A frame are split and grouped into multiple sub-channels, where each sub-channel includes one or more sub-carriers. OFDM/A frames are composed of many sub-carriers allocated in the frequency domain. In addition, the grouping may be applied for down stream traffic as well.

At step 804, each ONU is assigned with at least one sub-channel. The assignment may be made by control unit 610 of the OLT 608 and broadcasted from the OLT 608 to all ONUs through a downstream control message.

At step 806, each ONU employs a corresponding OFDM/A base-band transmitter, 612-1 to 612-4, to modulate data into an OFDM/A frame. A data stream of one ONU is split into several data streams and modulated on corresponding sub-carriers/sub-channels allocated to the ONU. The serial bits stream of one ONU is mapped to its own assigned sub-channels and spread in the frequency domain. The transmitter may convert a serial bit stream to multiple parallel bit streams and map each of them to their corresponding sub-channel by using a binary phase shift keying (BPSK) modulation scheme, for example. The unassigned sub-channels are set to zero and reserved for other ONUs. Here, each ONU may use only part of its total available bandwidth.

Additionally, any one or more of transmitters 612-1 to 612-14 may perform an inverse fast fourier transform (IFFT) to modulate the data and thereby generate a digital base-band OFDM frame which includes the same number of OFDM symbols as the number of total sub-carriers in the time domain. The digital base-band OFDM frame is converted into analog signals by a DAC, such as any one of DACs 614-1 to 614-4. The analog OFDM signals are baseband signals.

At step 808, the baseband OFDM/A signals are placed into different electrical carrier frequency bands, assigned as discussed above with respect to step 702, to generate Radio Frequency (RF) OFDM signals centered by carrier frequencies. For example, the base-band signals may be up-converted to carrier frequencies to form an analog RF OFDM frame by mixing the base-band signals with central RF carrier frequencies. The assignment of the centralized carriers and sub-carriers is managed by a control unit 610 in the OLT 608. Control unit 610 may assign the same central carrier frequency to multiple ONUs, as discussed above. ONUs using the same central carrier frequency may avoid signal overlap by assigning different OFDM sub-carriers to them, as discussed above. Further, ONUs using the same OFDM sub-carriers in an OFDM frame may avoid signal overlap by assigning them different central carrier frequencies. In this way, the total system capacity bandwidth, which in one or more implementations is much larger than the ONUs DAC bandwidth, can be efficiently utilized by signals by multiple ONUs. In addition, as discussed above, sampling by each ONU is limited to its own assigned electrical carrier frequency bandwidth. As such, DACs 614-1 through 614-4 that have lower sampling speeds than an ADC 616 at the OLT 608 may be employed in the ONUs to reduce their expense.

As stated above, each ONU may use only part of its total available bandwidth. In one implementation, when all the sub-channels within an assigned electrical frequency carrier bandwidth are used, additional sub-channels may be placed into different frequency bands by assigning additional carrier frequencies in accordance with an SCM scheme, as discussed above.

Referring again to method 800, at step 810, a laser, such as, for example, laser diodes 618-1 through 618-4, is modulated by an external modulator, such as, for example, any one of modulators 620-1 through 620-4, driven by the RF OFDM signals to generate output optical symbols at a WDM wavelength. Alternatively, a directly modulated laser (DML) may be driven directly by the RF OFDM signal. It should be noted that each laser 618-1 through 618-4 may output optical waves at different wavelengths $\lambda_1$, $\lambda_2$, $\lambda_3$, and $\lambda_4$, respectfully.

At step 812, multiple upstream signals transmitted by each ONU are aggregated at a wavelength multiplexing point by an AWG or coupler 622. For example, the optical OFDM symbols from multiple ONUs may be aggregated at the multiplexer 622. Due to the implementation of different wavelengths, no beat noise should occur. The aggregated optical signals may then be transmitted to OLT 608.

Referring again to FIG. 7 with continuing reference to FIG. 6, at step 706 optical signals may be received and demodulated to extract data. For example, with regard to upstream traffic, the optical signals transmitted by ONUs may be received and converted into electrical signals by a single optical receiver, such as photo detector 624. As illustrated in frequency domain plot 606, representing the output of photo detector 624, in one implementation of the present principles, signals from different ONUs may be separated in the frequency domain within different frequency bands. After the optical signals are converted to electrical signals, a low pass filter 628 may be employed. The output of the low pass filter 628 is represented in frequency domain plot 632 and is provided to ADC 616. After converting the signals to analogue form, the signals are provided to an SCM-OFDM/A receiver 630 for demodulation and data extraction. Because the data from all ONUs are mapped to the orthogonal sub-channels in the frequency domain, a single broadband OFDM/A receiver may be used to convert the received signals to the frequency domain. The SCM-OFDM/A receiver 630 may employ a fast Fourier transform (FFT) technique to convert the signals and demodulate them for bit stream extraction.

In implementations of a SOW-PON in accordance with aspects of the present principles, one high bandwidth ADC at the OLT may be used to receive upstream data from multiple ONU-s simultaneously. In contrast, as discussed above, SCM-PON systems employ multiple electrical receivers.

On the OLT side of a SOW-PON implementation described with respect to system 600, the ADC may have 40 Gsample/sec speed, which can accommodate a total system capacity bandwidth of 20 GHz. The 20 GHz bandwidth may be shared by 4 ONUs, each having a 5 GHz bandwidth. In OFDM/A-PON systems without SCM features according to aspects of the present principles, each ONU has the same high-speed 40 Gsample/sec DAC to generate a 20 GHz bandwidth signal where only a portion of the system capacity bandwidth is used by the ONUs at any moment. With SCM features in accordance with aspects of the present principles, each ONU may employ a 10 Gsample/sec DAC to generate its own 5 GHz baseband signal, where each ONU may use different carrier frequencies (e.g., 2.5 GHz, 5 GHz, 7.5 GHz and 10 GHz) to separate the signals in the frequency domain. In one implementation of the present principles, because different upstream data originating from different ONUs may be transmitted on different carrier frequencies without overlapping and because upstream data from each ONU is spread in the frequency domain using an OFDM/A scheme in accordance with aspects of the present principles, all upstream data in the frequency domain may be demodulated in SOW-PON systems by employing fast Fourier transforms.

Thus, in a SOW-PON system in accordance with aspects of the present principles, each ONU may use a relatively low sampling speed DAC to generate its own baseband signal and employ a different carrier frequency to separate its signal from the signals of other ONUs in the frequency domain. In certain implementations, the DAC bandwidth in one ONU may be fully utilized by the ONU itself and the DAC sampling speed may be much lower than the ADC sampling speed of the OLT. As such, the expense of ONUs may be significantly reduced.

While implementations of the present principles have been described with respect to upstream traffic originating from ONUs and transmitted and processed at an OLT, it should be understood that the method steps, systems and apparatuses described above may also be applied to downstream traffic. For example, the control unit 610 may assign electrical carrier frequency bandwidths as described above and the OLT 608 may modulate optical waves as discussed above with respect to step 704. The AWG 622 or another type of WDM multiplexer/demultiplexer may demultiplex signals from the OLT 608 and transmit them to individual ONUs, which may be assigned unique WDM wavelengths, as discussed above. The ONUs may process the signals and extract data bit streams originating from the OLT 608.

Various simulations of a number of implementations SOW-PON systems have been conducted. In one simulation, the performance of the architecture described with respect to system 600 of FIG. 6 was examined. The simulation included four ONUs that were configured to map 2 Gbps-4 Gbps of data to 2.5 GHz bandwidths employing BPSK/QPSK modulation. The four ONUs simultaneously transmitted data upstream. The data from each ONU was separated by different carrier frequencies, 2.5 GHz, 5 GHz, 7.5 GHz and 10 GHz, and wavelengths 1553.6 nm, 1552.6 nm, 15516 nm and 1550.6 nm, respectively corresponding to each ONU.

Four 2.5 GHz electrical carrier frequency bandwidths were allocated from a 12 GHz system capacity bandwidth. Each 2.5 GHz bandwidth was divided into 256 sub-channels. In the upstream direction, a small guard band was placed between signals of two adjacent ONUs signals to minimize any inter-carrier interference (ICI). The guard bands may be implemented by adjusting to zero the first and last 28 sub-channels in each OFDM transmitter. The total receiving bandwidth at the OLT was 20 GHz, corresponding to 2048 sub-channels. Every 4096 symbols, the OFDM/A receiver at the OLT performed a FFT operation and demodulated the signals. The OFDM/A receiver related sub-channels 157 to 357 to data received from a first ONU, related sub-channels 358 to 558 to the data received from a second ONU and so on. As BPSK and QPSK modulations were used in the simulation, each ONU had nominal data rate of 2 Gbps or 4 Gbps.

The bit error rate (BER) based on different transmission distances and received optical power were determined. The results indicated that for a 20 km distance, a BER of $10^{-3}$ or smaller may be easily obtained at the received optical power −5 dBm or higher. An excellent transmission performance may be obtained with a BER of $10^{-9}$ or less by employing Forward Error Correction (FEC). As the transmission distance increases, a BER floor would result, which is caused by the dispersion effects of the fiber.

A simulation of another implementation of a SOW-PON system including 18 ONUs and a single optical/electrical receiver was also simulated. Various ONUs simultaneously transmitted data upstream at speeds of 100 Mbps, 1 Gbps and 10 Gbps, respectively. The combined total bandwidth for the ONUs was 20 GHz. An optical detector and 20 GHz broadband ADC was included in the OLT to transform the received optical waveforms to digital signals for further digital processing. BPSK modulation was performed by all ONUs. Eleven ONUs transmitting data at 100 Mbps shared an electrical carrier frequency bandwidth of zero to 2 GHz, six ONUs transmitting data at 1 Gbps shared an electrical carrier frequency bandwidth of 2 GHz to 10 Hz, and the ONU transmitting data at 10 Gbps ONU utilized the electrical carrier frequency bandwidth of 10 GHz to 20 GHz. Favorable BERs under various conditions were also achieved for the eighteen ONU simulation.

As discussed above, in accordance with aspects of the present principles, a single receiver may be used to receive upstream data originating from multiple ONUs simultaneously. Due to the digital processing in the frequency domain, tunable sub-band receivers and frequency de-multiplexers in conventional SCM systems need not be employed. A single receiver permits dynamic, cost-efficient assignment of any available bandwidth capacity to any ONU based on their requests by utilizing different carrier frequencies and electrical carrier frequency bandwidths. Furthermore, the overall capacity is dependent on the bandwidth of the ADC and the computing capabilities of the digital processing receiver at the OLT. Additional ONUs may be easily incorporated into the system by simply assigning a unique WDM wavelength. As the number of ONUs increases, the overall capacity can be enlarged using either a larger bandwidth ADC or adding another receiver at the OLT and using a radial basis function to divide the traffic. As such, SOW-PON systems in accordance with aspects of the present principles can provide simplicity, flexibility, scalability, upgradeability and diversity cost-efficiently.

It should be understood that implementations described herein may be entirely hardware, entirely software or including both hardware and software elements. In one implementation, the present principles are implemented in software, which includes but is not limited to firmware, resident software, microcode, etc.

Implementations may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Having described implementations of systems, methods and apparatuses (which are intended to be illustrative and not limiting), it is noted that modifications and variations can be made by persons skilled in the art in light of the above teachings. It is therefore to be understood that changes may be made in the particular implementations disclosed which are within the scope and spirit of the invention as outlined by the appended claims. Having thus described aspects of the present principles, with the details and particularity required by the patent laws, what is claimed and desired protected by Letters Patent is set forth in the appended claims.

What is claimed is:

1. A method for transmitting data through a sub-carrier multiplexing and orthogonal frequency-division multiple access passive optical network comprising:
    assigning to each of a plurality of optical network units, in accordance with a sub-carrier multiplexing scheme, an electrical carrier frequency bandwidth that is narrower than a system capacity bandwidth;
    modulating optical waves in accordance with an orthogonal frequency-division multiple access scheme such that each optical network unit is allocated a different set of orthogonal sub-carrier frequencies and such that sampling of said orthogonal sub-carrier frequencies for each optical network unit is limited to the corresponding electrical carrier frequency bandwidth assigned to the optical network unit; and
    receiving and demodulating the optical waves to extract data.

2. The method of claim 1, wherein at least two of the electrical carrier frequency bandwidths overlap.

3. The method of claim 1, wherein the bandwidths electrical carrier frequency bandwidths do not overlap.

4. The method of claim 1, wherein the electrical carrier frequency bandwidths are assigned dynamically over time such that the assigned electrical carrier frequency bandwidths vary for at least one optical network unit.

5. The method of claim 1, wherein the sets of sub-carrier frequencies are allocated dynamically in the time domain such that the allocated orthogonal sub-carrier frequencies vary for at least one optical network unit.

6. The method of claim 1, wherein the modulating includes modulating on different optical wavelengths corresponding to each optical network unit.

7. The method of claim 1, wherein the electrical carrier frequency bandwidth of each optical network unit is centered by a different carrier frequency.

8. The method of claim 7, wherein the electrical carrier frequency bandwidths have the same bandwidth and the central carrier frequencies are whole-number multiples of the electrical carrier frequency bandwidth.

9. A system for transmitting data through a sub-carrier multiplexing and orthogonal frequency-division multiple access passive optical network comprising:
    a plurality of optical network units, each of which is assigned, in accordance with a sub-carrier multiplexing scheme, an electrical carrier frequency bandwidth that is narrower than a system capacity bandwidth, wherein each optical network unit is configured to transmit optical waves that are modulated in accordance with an orthogonal frequency-division multiple access scheme such that different sets of orthogonal sub-carrier frequencies are allocated to each optical network unit and such that sampling of said orthogonal sub-carrier frequencies for each optical network unit is limited to the corresponding electrical carrier frequency bandwidth assigned to the optical network unit; and
    an optical line terminal that is configured to receive the modulated optical waves for data processing and is configured to assign the electrical frequency bandwidths and allocate the sets of orthogonal sub-carrier frequencies to the plurality of network optical units.

10. The system of claim 9, wherein each optical network unit includes a digital to analogue converter, each digital to analogue converter having a sampling capacity that is lower than a sampling capacity of an analogue to digital converter included in the optical line terminal.

11. The system of claim 9, wherein the optical line terminal further includes a single optical receiver and a single electrical receiver to process a plurality of bit streams transmitted by the plurality of optical network units.

12. The system of claim 9, wherein the modulating includes modulating on different optical wavelengths corresponding to each optical network unit.

13. The system of claim 12, further comprising:
    an arrayed-waveguide grating configured to direct transmission between the optical line terminal and the plurality optical network units by multiplexing and demultiplexing optical waves having different wavelengths.

14. The system of claim 9, wherein at least two of the electrical carrier frequency bandwidths overlap.

15. The system of claim 9, wherein the electrical carrier frequency bandwidths do not overlap.

16. The system of claim 9, wherein the electrical carrier frequency bandwidths are assigned dynamically over time such that the assigned electrical carrier frequency bandwidths vary for at least one optical network unit.

17. The system of claim 9, wherein the sets of sub-carrier frequencies are allocated dynamically in the time domain such that the allocated orthogonal sub-carrier frequencies vary for at least one optical network unit.

18. The system of claim 9, wherein the electrical carrier frequency bandwidth of each optical network unit is centered by a different carrier frequency.

19. The system of claim 18, wherein the electrical carrier frequency bandwidths have the same bandwidth and the central carrier frequencies are whole-number multiples of the electrical carrier frequency bandwidth.

20. A receiver apparatus for receiving data through a sub-carrier multiplexing and orthogonal frequency-division multiple access passive optical network comprising:
    a control unit configured to assign to each of a plurality of optical network units, in accordance with a sub-carrier multiplexing scheme, an electrical carrier frequency bandwidth that is narrower than a system capacity bandwidth,
    wherein the control unit is further configured to allocate, in accordance with an orthogonal frequency-division multiple access scheme, a different set of orthogonal sub-carrier frequencies to each optical network unit such that sampling of said orthogonal sub-carrier frequencies for each optical network unit is limited to the corresponding electrical carrier frequency bandwidth assigned to the optical network unit;
    a photodetector configured to convert received optical signals to electrical signals, wherein the electrical signals are modulated in accordance with an orthogonal frequency-division multiple access scheme such that a different set of orthogonal sub-carrier frequencies originate from each of a plurality of optical network units; and
    an electrical receiver configured to extract data originating from the plurality of optical network units by demodulating electrical carrier frequency bandwidths that are narrower than a system capacity bandwidth, wherein each electrical carrier frequency bandwidth corresponds to each of the plurality of optical network units.

* * * * *